(12) United States Patent
Kleppel et al.

(10) Patent No.: US 7,020,809 B2
(45) Date of Patent: Mar. 28, 2006

(54) SYSTEM AND METHOD FOR UTILIZING SPARE BANDWIDTH TO PROVIDE DATA INTEGRITY OVER A BUS

(75) Inventors: Yvonne Hanson Kleppel, Tucson, AZ (US); Russell Lee Ellison, Corona de Tucson, AZ (US); Enrique Garcia, Tucson, AZ (US); Rajendrasinh Banesinh Jadeja, Tucson, AZ (US); Gregg Steven Lucas, Tucson, AZ (US); Robert Earl Medlin, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 493 days.

(21) Appl. No.: 10/255,040

(22) Filed: Sep. 25, 2002

(65) Prior Publication Data

US 2004/0059967 A1    Mar. 25, 2004

(51) Int. Cl.
*G06F 11/00* (2006.01)
(52) U.S. Cl. ............................ 714/52; 714/30; 370/242
(58) Field of Classification Search ................ 714/50, 714/51, 52, 5, 27, 30; 710/106; 370/242, 370/282
See application file for complete search history.

(56) References Cited

U.S. PATENT DOCUMENTS

| | | | | |
|---|---|---|---|---|
| 5,167,034 A | * | 11/1992 | MacLean et al. | ............... 714/52 |
| 5,490,253 A | | 2/1996 | Laha et al. | |
| 5,506,958 A | * | 4/1996 | Myran | .......................... 714/18 |
| 5,507,002 A | | 4/1996 | Heil | |
| 5,517,615 A | | 5/1996 | Sefidvash et al. | |
| 5,790,811 A | * | 8/1998 | Hewitt | ........................ 710/105 |
| 5,872,992 A | | 2/1999 | Tietjen et al. | |
| 5,878,255 A | | 3/1999 | Tran et al. | |
| 5,978,907 A | | 11/1999 | Tran et al. | |
| 6,035,425 A | * | 3/2000 | Caldwell et al. | ............... 714/52 |
| 6,092,219 A | * | 7/2000 | Porterfield | ..................... 714/37 |
| 6,170,040 B1 | | 1/2001 | Lee et al. | |
| 6,286,125 B1 | * | 9/2001 | Leshay et al. | ............... 714/807 |
| 6,314,106 B1 | | 11/2001 | King et al. | |
| 6,763,481 B1 | * | 7/2004 | Yamane | ........................ 714/11 |

OTHER PUBLICATIONS

English Language Abstract of Japanese Publication No. 20012, published Oct. 26, 2001.

* cited by examiner

*Primary Examiner*—Robert Beausoliel
*Assistant Examiner*—Philip Guyton
(74) *Attorney, Agent, or Firm*—Scully, Scott, Murphy & Presser; Douglas R. Millett, Esq.

(57) ABSTRACT

A system and method for verifying integrity of data signals communicated from a data transmit device to a receive device over a communications channel of limited bandwidth. The method comprising steps of: a) detecting instances of idle data transmit activity at the transmit device; b) accumulating data integrity information for data transmitted over the communication channel between detected idle transmit instances, the accumulating being performed by data integrity verifier devices at both transmit and receive devices; c) communicating accumulated data integrity information for data transmitted since a last detected idle data transmit instance during a current detected idle data transmit instance; and, d) verifying accumulated data integrity information communicated over the channel at the receiver device. The system and method of the invention may be used to provide intermediate data integrity checks when communication of packets belonging to a stream is interrupted without compromising bandwidth utilization. Moreover, the system and method of the invention may be used to provide data integrity verification for data communicated over two or more communications channels between instances of detected idle transmit states.

26 Claims, 4 Drawing Sheets

SYSTEM AND METHOD FOR UTILIZING SPARE BANDWIDTH TO PROVIDE DATA INTEGRITY OVER A BUS

BACKGROUND OF THE INVENTION

1. Field of the Invention

The present invention relates generally to data transmission systems where data is communicated over a communications channel such as a bus device, and particularly, to a system and method for providing data integrity for the data communicated over the bus.

2. Discussion of the Prior Art

A typical bus for transmitting information includes idle cycles during normal operation, and it includes additional information during non-idle cycles to provide data integrity. The traditional method of providing data integrity include adding extra signals to the bus, such as parity bits, or generating additional non-idle cycles for transmitting the data integrity information, such as additional data packets.

It would be highly desirable to provide a system and method for eliminating the need for additional signals or non-idle cycles with each transmission and to better utilize the idle times on the bus.

SUMMARY OF THE INVENTION

It is an object of the present invention to provide a new method for using the idle cycles of the bus to provide data integrity.

It is a further object of the present invention to provide a communication system that includes a transmitter and a receive device where data is transmitted over a communications channel, wherein a system and method is implemented for recognizing an idle condition at a transmitter device, the transmitter device is provided with ability to accumulate data integrity information between idle cycles, and transmit accumulated data integrity information during an idle cycle of the bus to the receiver.

According to a preferred aspect of the invention, there is provided a system and method for verifying integrity of data signals communicated from a data transmit device to a receive device over a communications channel of limited bandwidth, the data transmit and data receive devices including control means for controlling respective data transmit and data receipt operations at respective transmit and receive devices, the method comprising steps of: a) detecting time instances of idle data transmit activity at the transmit device; b) accumulating data integrity information for data transmitted over said communication channel between detected idle transmit instances, the accumulating being performed by data integrity verifier devices at both transmit and receive devices; c) communicating accumulated data integrity information for data transmitted since a last detected idle data transmit instance during a current detected idle data transmit instance; and, d) verifying accumulated data integrity information communicated over the channel at the receiver device.

Advantageously, the system and method of the invention may be used to provide intermediate data integrity checks when communication of packets belonging to a stream is interrupted, without compromising channel bandwidth utilization. Moreover, the system and method of the invention may be used to provide data integrity verification for data signals communicated over two or more communications channels between instances of detected idle transmit states.

BRIEF DESCRIPTION OF THE DRAWINGS

The objects, features and advantages of the present invention will become apparent to one skilled in the art, in view of the following detailed description taken in combination with the attached drawings, in which.

DETAILED DESCRIPTION OF PREFERRED EMBODIMENT

Figure 1:
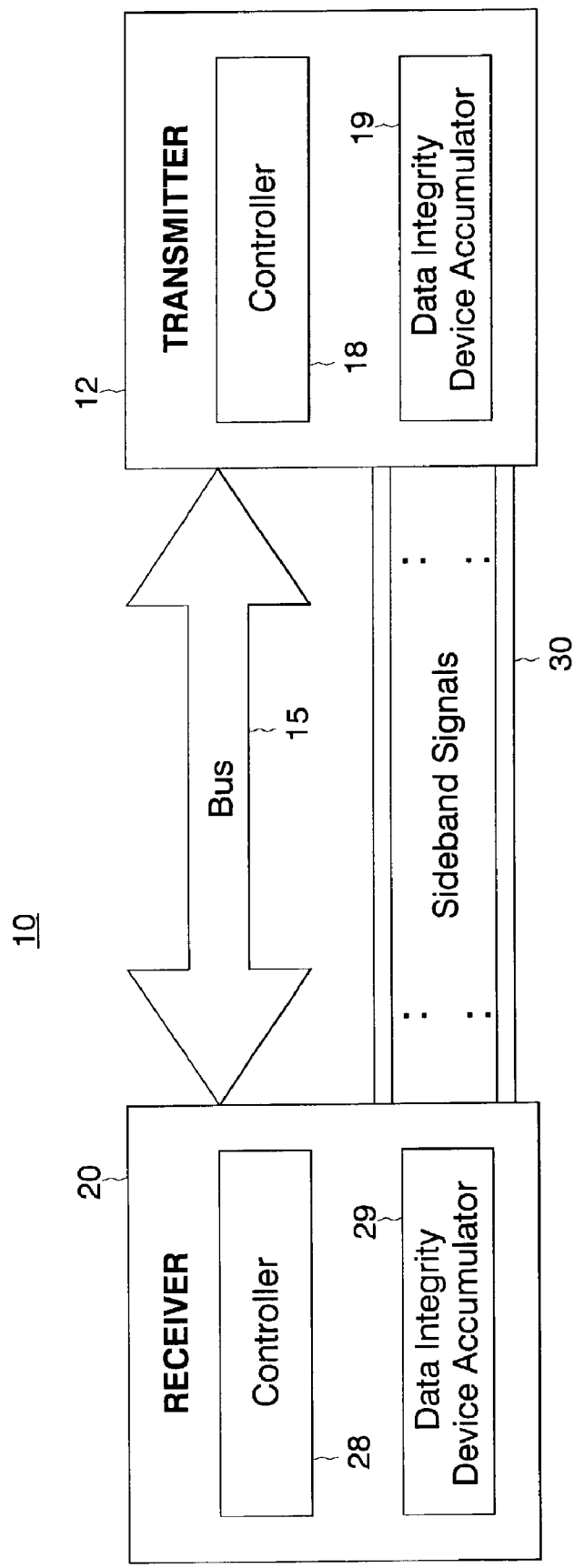
FIG. 1 is a general block diagram of a communication network implementing the system and methodology of the present invention.

FIG. 1 illustrates a communication system 10, e.g., a network, including nodes having a data transmitter device 12 for communicating data over a communications channel, such as a data bus 15, for receipt by a receiver device 20. The network itself may be any communications network provided with a bus or link enabling parallel or serial data communication and, that may have usable bandwidth at intervals when there is no data being transmitted. In these networks, a communications protocol may be implemented that does not necessarily recognize idle clock cycles at the transmitter, i.e., does not define special data representing idle time. However, the method for utilizing the idle cycles for performing data integrity according to the invention, requires the ability to recognize an idle condition (i.e., idle cycles detected in a receiver) and accumulate data integrity information between idle cycles. As shown in FIG. 1, the transmitter 12 is provided with control functionality 18 for controlling bus and valid data transmit functionality, and a data integrity device 19 implementing data integrity algorithm used to verify integrity of transmitted valid data. Preferably, such data integrity algorithms include arithmetic checksum, parity, Cyclic Redundancy Checking (CRC) implementing polynomial based algorithms, Error Correction Code (ECC) (with or without bit error correction functionality), and the like. Control functionality 18 is enabled to recognize a clock idle condition (idle clock cycles) and initiate transmission over bus 15 the data integrity information the data integrity device 19 has been accumulating since the last idle condition. The data integrity device 19 is additionally programmed to begin new data integrity accumulation as it transmits the old data integrity information. The receiver device 20 is provided with control functionality 28 for controlling bus and valid data receive functionality, and a data integrity device 29 implementing a compatible data integrity algorithm for verifying integrity of received valid data. As will be explained in greater detail, the control device 28 of receiver 20 recognizes the idle condition, and compares its accumulated data integrity information obtained from data integrity device 29 since the last idle cycle with the data integrity information it just received from the transmitter. The receiver 20 additionally begins accumulating new data integrity information after checking the data sent by the transmitter.

It should be understood that the data integrity devices 19, 29 generate data computed as a result of implementing any standard data integrity algorithm for valid data communicated, e.g., checksum, parity, Cyclic Redundancy Checking (CRC) or like polynomial based algorithms, Error Correction Code (ECC), and the like. It is understood that the resulting integrity information output from the algorithm, i.e., including any accumulated result, is capable of being transmitted over the bus structure 15 or communication link, for transmission from transmitter to the receiver. It is further understood that the data integrity check performed by respective data integrity devices 19, 29 may be used to verify integrity of network supplementary control signals and/or "sideband" signals communicated between transmit device 12 and receiver device 20 over a separate bus or communication lines 30.

Table 1 illustrates an example sequence of data communicated on bus 15 of FIG. 1. The example illustrates use of a tag as part of the data to signal an idle condition and CRC (cyclic redundancy checking) as the method of providing data integrity.

TABLE 1

| time 0 | IDLE TAG | INITIAL CRC DATA |
|---|---|---|
| time 1 | DATA TAG | VALID DATA 1 PACKET |
| time 2 | DATA TAG | VALID DATA 1 PACKET |
| time 3 | IDLE TAG | CRC DATA ACROSS DATA 1 PACKET |
| time 4 | IDLE TAG | INITIAL CRC DATA |
| time 5 | IDLE TAG | INITIAL CRC DATA |
| time 6 | DATA TAG | VALID DATA 2 PACKET |
| time 7 | DATA TAG | VALID DATA 2 PACKET |
| time 8 | DATA TAG | VALID DATA 2 PACKET |
| time 9 | DATA TAG | VALID DATA 2 PACKET |
| time 10 | DATA TAG | VALID DATA 2 PACKET |
| time 11 | DATA TAG | VALID DATA 2 PACKET |
| time 12 | DATA TAG | VALID DATA 2 PACKET |
| time 13 | IDLE TAG | CRC DATA ACROSS FIRST HALF DATA 2 PACKET |
| time 14 | DATA TAG | VALID DATA 2 PACKET |
| time 15 | DATA TAG | VALID DATA 2 PACKET |
| time 16 | DATA TAG | VALID DATA 2 PACKET |
| time 17 | DATA TAG | VALID DATA 2 PACKET |
| time 18 | DATA TAG | VALID DATA 2 PACKET |
| time 19 | DATA TAG | VALID DATA 2 PACKET |
| time 20 | DATA TAG | VALID DATA 2 PACKET |
| time 21 | IDLE TAG | CRC DATA ACROSS SECOND HALF DATA 2 PACKET |

As the Table 1 shows in an exemplary scenario, a transmission begins with an idle cycle sending initial data integrity information, e.g., CRC data. Then, two valid data packets are sent to create DATA 1. This is followed by three idle cycles. The first idle cycle contains the CRC data accumulated since the previous idle cycle—i.e., CRC for DATA 1. The second and third idle cycles include only initial CRC data since no valid data has been sent since the previous idle cycles. These idles are followed by more valid data packets of DATA 2 followed with the concluding idle cycle and CRC data over the second half of DATA 2. The idle cycle transmission of data integrity during the DATA 2 interruption allows for an intermediate data integrity check that is not available with traditional methods of additional data packets. One additional advantage not illustrated in this example is the lack of intelligence needed for data integrity. There is no need for knowledge of the data packet format. The only requirement is recognizing an idle condition and providing a data integrity algorithm.

As mentioned, an extension of this technique allows for integrity checking of "sideband" or supplemental signals which are sent in the same time domain but not necessarily directly related to the data packets. If the data integrity algorithm, e.g., CRC generation/checking, is expected to include these sideband signals, the integrity of these additional signals may be greatly improved with no loss of bandwidth and without additional signals such as parity bits.

Figure 2:
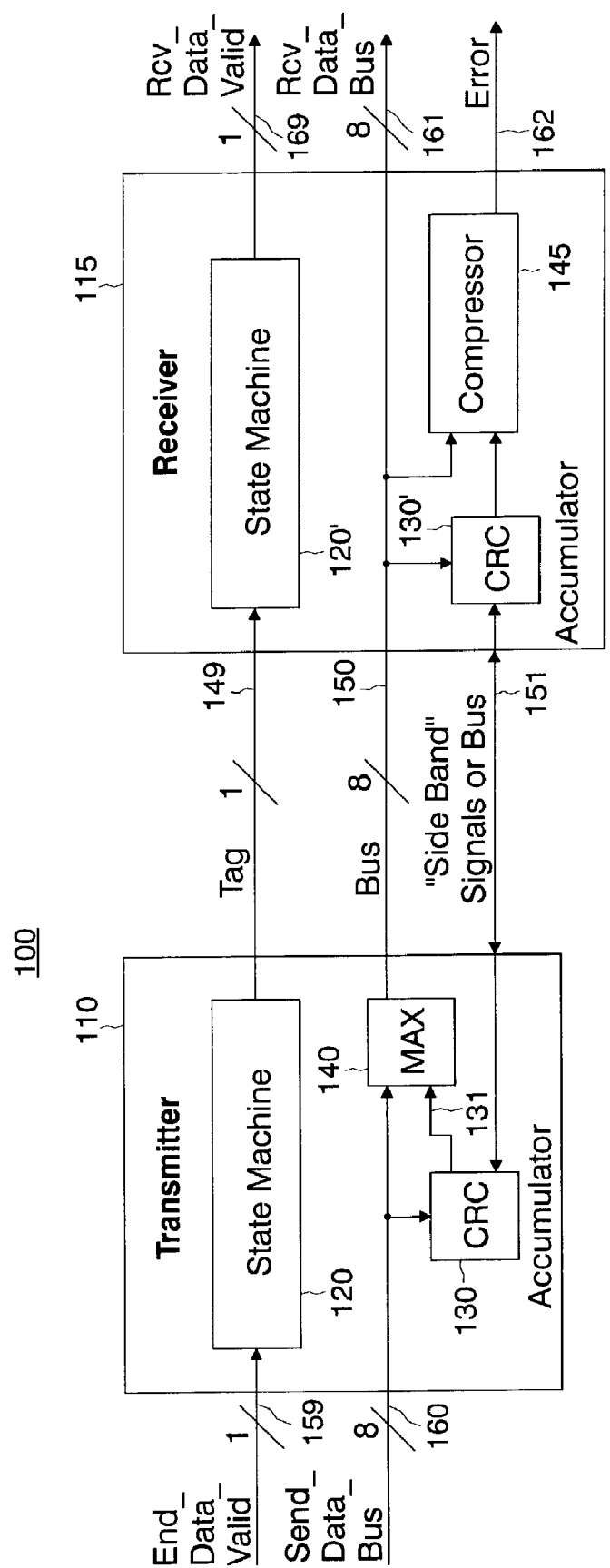
FIG. 2 is a detailed diagram of a communication network implementing CRC data integrity device according to an exemplary embodiment of the present invention.

FIG. 2 depicts a more detailed example system topology 100 in which the invention operates. In this system topology, it is assumed that a CRC data integrity algorithm is implemented. In the topology 100, data is communicated over a bus 150 between transmitter 110 and receiver 115 devices. For exemplary purposes, the bus 150 comprises a parallel bus configuration of 8-, 16-, 32-, 36-, or 64-bits wide. However, it is understood that the principles of the invention may be applied to parallel and serial buses. The transmitter 110 includes: a state machine 120 programmed to execute the methodology of the invention, a data integrity accumulation block 130 interfaced to bus 150 and, a second bus or communication channel 151 which supports communication of "side band" signals such as system control signals between the transmitter and receiver and, a multiplexor device interface 140 to the parallel bus 150. In the exemplary embodiment, the data integrity accumulator is a CRC accumulator 130 that performs real-time, polynomial-based data integrity processing and result accumulation for concurrent data transmissions over both busses 150, 151 in between detected IDLE transmit states. Via line 131, accumulated data verification information processed by CRC accumulator 130 for valid data communicated over the channel or bus 150 and data communicated over the "side band" signal bus 151, since a prior detected IDLE transmit state, is multiplexed for communication over channel 150 during the current detected IDLE state. Likewise, the Receiver device 115 includes: a state machine 120' programmed to execute the methodology of the invention, a CRC accumulator block 130' interfaced to bus 150 for receiving transmitted data and interfaced to "side band" signals bus 151 for concurrently receiving control and/or "side band" signals, and a compare device 145 for comparing the accumulated CRC data verification information sent from the transmitter with the data integrity results concurrently accumulated at the receiver accumulator 130' since a prior detected IDLE transmit state. The system 100 further includes a capability for communicating transmit state information to the receiver device for indicating an IDLE data transmit instance. This is implemented as a drive tag data line depicted in FIG. 2 as line 149 however, it is understood that it may be part of the either bus 150, 151.

Figure 3:
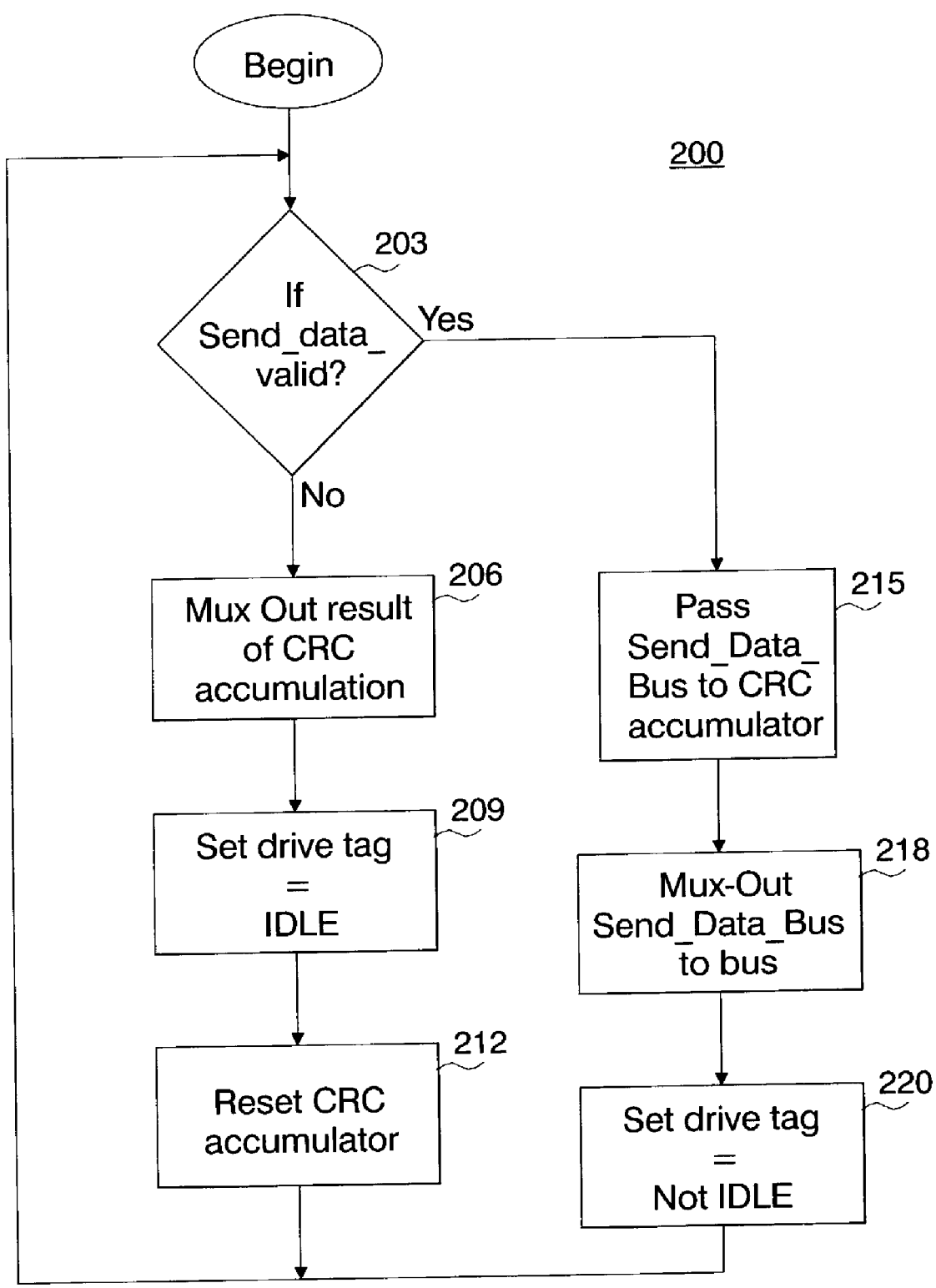
FIGS. 3 and 4 respectively illustrate the methodology implemented by each respective transmitter state machine 120 and receiver state machine 120' illustrated in FIG. 2.
Figure 4:
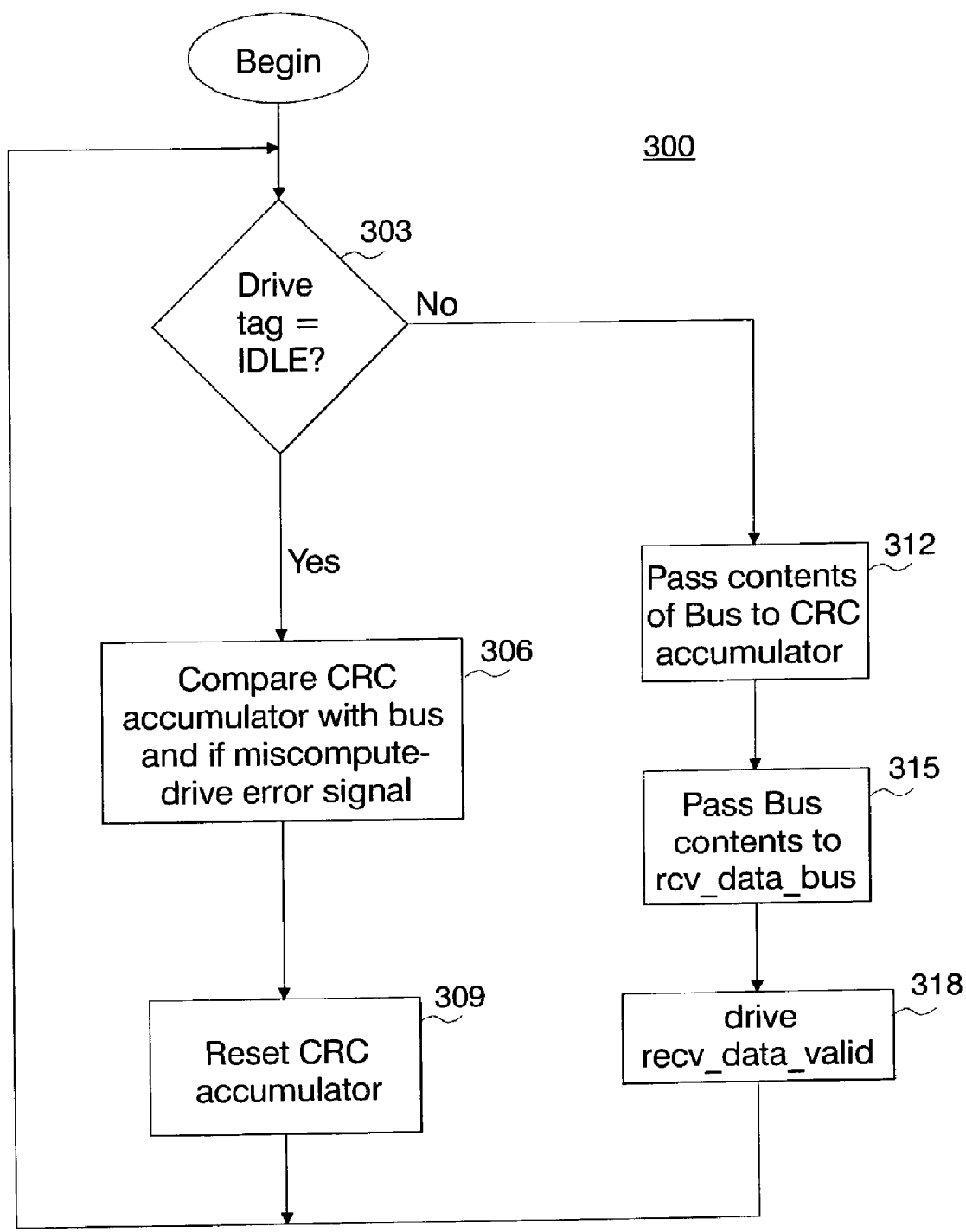

The methodology implemented by each transmitter state machine 120 and receiver state machine 120' in FIG. 2 is now described with respect to FIGS. 3 and 4, respectively. As shown in FIG. 3, there is depicted the methodology 200 implemented in the transmitter 110. As shown in first step 203, there is the step of receiving a data_valid (state) signal depicted as input 159 in FIG. 2, and determining whether a send_data_valid signal 159 is active indicating valid data transmission over a send_data_bus 160. If a send_data_valid signal is not active, then the process proceeds to step 206 where the accumulated results of the CRC accumulation operations performed in CRC accumulator 130 is generated. That is, as no valid data is being sent over bus 150, the CRC obtains the accumulated result of data integrity processing since a prior idle cycle and transmits it over data bus 150 via multiplexor 140. In addition, as indicated at step 209, a drive tag is set to indicate a transmit IDLE state and communicated over drive tag data line 149 for receipt by the receiver. Finally, as indicated at step 212, the CRC accumulator is reset in preparation for processing new valid data input from bus 150 or side band signals over bus 151 for a next valid data transmission cycle. As shown in FIG. 3, returning back to step 203, if a send_data_valid signal 159 is active indicating valid data transmission over bus 160, then at step 215, an operation for passing valid data from the send_data- _bus 160 to the CRC accumulator 130 is performed. Then, at step 218, the actual parallel data (from send_data_bus) is transmitted over parallel data bus 150 via multiplexor 140, and, at step 220, a drive tag is set to indicate a NOT IDLE state and communicated over drive tag data line 149 for receipt by the receiver. The state machine 110 implemented in the transmitter is a continuous real-time process and from each of steps 212 and 220, the process returns to step 203 to ascertain the current data transmitter state (the send_data_valid signal 159).

As shown in FIG. 4, there is depicted the methodology 300 implemented in the state machine 120' of data receive device 115. As shown in first step 303, there is the step of receiving drive tag signal over tag line 149 and determining the current transmit state. At step 303, if the drive tag indicates an IDLE state, then at step 306, a comparison operation is performed in compare device 145 to compare the accumulated CRC result of data integrity processing performed for the past data transmission cycle at the receiver CRC accumulator 130' and the accumulated result of data integrity processing since a prior data transmission cycle received via data bus 150 from the transmitter CRC accumulator 130. If the result of the comparison indicates a data integrity error, then a drive error control signal 162 may be generated and appropriate error recovery action initiated. Otherwise, the process continues to step 309 where the receiver CRC accumulator 130' is reset for performing data integrity operation for a next cycle of valid data received from the transmitter over bus 150. The process returns to step 303 to ascertain the drive tag state. If, at step 303, it is determined that the drive tag indicates a NOT IDLE state, then valid data is being transmitted over bus 150. The receiver, at step 312 will pass the contents of the bus 150 to the CRC accumulator for data integrity processing and, at step 315, the contents of bus 150 is passed to the rcv_data_bus 161 for further processing or storage. Finally, at step 318, the state machine 120' generates a drive tag 169 indicating valid data currently received and communicated over bus 161 for further processing and/or storage.

It is understood that the invention may be used to verify data integrity for supplementary control or sideband signals communicated over bus 151, in the same manner as implemented for data signals transmitted over bus 150.

While the invention has been particularly shown and described with regard to a preferred embodiment thereof, it will be understood by those skilled in the art that the foregoing and other changes in form and details may be made therein without departing from the spirit and scope of the invention.

Having thus described our invention, what we claim as new, and desire to secure by Letters Patent is:

1. A system for verifying data integrity of data signals communicated between a transmitter device and a receiver device over a communications channel of limited bandwidth, said system comprising:
   a control means at said transmitter device and receiver device for controlling respective data transmit and data receipt operations over said channel, said control means at said transmitter capable of detecting instances of idle data transmit activity at said transmitter;
   a data integrity verifier means at said transmitter device and receiver device for verifying integrity of data communicated over said channel in between instances of idle data transmit activity,
   wherein data integrity information accumulated at said transmitter since a last detected idle data transmit instance is communicated over said channel for receipt by said receiver device for data integrity verification during a current time interval of idle data transmit activity, thereby optimizing bandwidth utilization of said channel.

2. The system for verifying data integrity as claimed in claim 1, wherein said data integrity verifier means at said transmitter device and receiver device enables respective accumulation of data integrity information for data transmitted and received over said channel in between each detected idle data transmit instance, a new data integrity verification cycle being initiated for new data transmitted after each detected idle data transmit instance.

3. The system for verifying data integrity as claimed in claim 2, wherein said communications channel is a parallel bus for communicating valid data packets according to a communications protocol in between instances of idle data transmit activity.

4. The system for verifying data integrity as claimed in claim 2, wherein said communications channel for communicating data between a transmitter device and a receiver device includes a communication link for communicating sideband signals unrelated to valid data transmitted over said channel, said data integrity verifier means performing data integrity operations for both valid data packets and data transmitted as sideband signals in between instances of detected idle data transmit instances.

5. The system for verifying data integrity as claimed in claim 4, wherein said sideband signals include signals unrelated to data for controlling communication activity over said link between detected idle data transmit intervals.

6. The system for verifying data integrity as claimed in claim 1, wherein said control means at said transmitter device comprises: means for notifying said receiver device of a detected idle data transmit instance, said control means at said receiver device responsive to said notification for initiating data integrity verification for data received from said transmitter since said prior detected idle instance.

7. The system for verifying data integrity as claimed in claim 6, wherein said means for notifying generates an IDLE tag signal in response to detecting a time interval of idle data transmit activity at said transmitter and communicating said IDLE tag signal to receiver device, said means at said receiver device responsive to said received IDLE tag signal.

8. The system for verifying data integrity as claimed in claim 6, wherein said receiver device further comprises: a compare means for comparing accumulated data integrity information obtained from said data integrity verifier means at said receiver since a last detected idle data transmit instance with the data integrity information received from the transmitter during the current time interval of idle data transmit activity.

9. The system for verifying data integrity as claimed in claim 8, wherein said receiver device further includes means responsive to said compare means for generating an error signal when accumulated data integrity information obtained from said data integrity verifier means at said receiver device does not match the data integrity information received from the transmitter during the current time interval of idle data transmit activity.

10. The system for verifying data integrity as claimed in claim 7, wherein said generated IDLE tag signal is communicated to said receiver device over a separate communication signal line separate from said channel.

11. The system for verifying data integrity as claimed in claim 7, wherein data packets of a data stream type are interrupted by a detected idle data transmit instance, said idle cycle data transmit instance enabling data verification integrity for said stream for data communicated prior to and after said idle cycle data transmit instance, said system enabling an intermediate data integrity check.

12. The system for verifying data integrity as claimed in claim 2, wherein said data integrity verifier means includes a cyclic redundancy code (CRC) generator.

13. A method for verifying integrity of data signals communicated from a data transmit device to a receive device over a communications channel of limited bandwidth, the data transmit and data receive devices including control means for controlling respective data transmit and data receipt operations at respective transmit and receive devices, said method comprising:
   a) detecting time instances of idle data transmit activity at said transmit device;
   a) accumulating data integrity information for data transmitted over said communication channel between detected idle transmit instances, said accumulating being performed by data integrity verifier devices at both transmit and receive devices;
   c) communicating accumulated data integrity information for data transmitted since a last detected idle data transmit instance during a current detected idle data transmit instance; and,
   d) verifying accumulated data integrity information communicated over said channel at said receiver device.

14. The method for verifying data integrity as claimed in claim 13, wherein said accumulated data integrity information is communicated to said receiver device over one of: a serial bus or a parallel bus.

15. The method for verifying data integrity as claimed in claim 13, wherein after step c) of communicating accumulated data integrity information for data transmitted since a prior detected idle data transmit instance, a step of: initiating a new data integrity verification cycle for new data transmitted from said transmit device to said receive device after each detected idle data transmit instance.

16. The method for verifying data integrity as claimed in claim 13, wherein step c) of communicating includes the step of notifying said receiver device of a detected idle data transmit instance, said control means at said receiver device responsive to said notification for initiating data integrity verification for data received from said transmitter since said prior detected idle data transmit instance.

17. The method for verifying data integrity as claimed in claim 16, wherein said notifying step includes generating an IDLE tag signal in response to detecting a time interval of idle data transmit activity at said transmitter and communicating said IDLE tag signal to receiver device, said receiver device responsive to said received IDLE tag signal.

18. The method for verifying data integrity as claimed in claim 16, wherein said verifying step d) includes a step of: comparing accumulated data integrity information obtained from said data integrity verifier device at said receiver since a last detected idle data transmit instance with the data integrity information received from the transmitter during a current time interval of idle data transmit activity.

19. The method for verifying data integrity as claimed in claim 18, wherein as a result of said comparing a step of: generating an error signal when accumulated data integrity information obtained from said data integrity verifier device at said receiver device does not match the data integrity information received from the transmitter.

20. The method for verifying data integrity as claimed in claim 17, wherein said generated IDLE tag signal is communicated to said receiver device over a separate communication signal line separate from said channel.

21. The method for verifying data integrity as claimed in claim 18, further including a step of interrupting flow of data packets of a data stream type by detecting an idle data transmit instance, said method including performing an intermediate data integrity check by enabling data verification integrity for said stream for data communicated prior to and after said detected idle data transmit instance.

22. The method for verifying data integrity as claimed in claim 15, wherein said communications channel for communicating data between a transmitter device and a receiver device includes a communication link for communicating sideband signals unrelated to valid data transmitted over said channel, wherein said accumulating, communicating and verifying steps are performed for both valid data packets and data transmitted as sideband signals in between instances of detected idle data transmit instances.

23. A system for verifying integrity of data signals communicated between a data transmit device and a data receive device in a communications network, said system comprising:
   a first communication channel for communicating signals of first data content between said data transmit device and a data receive device, and a second communication channel for communicating data of second data content between said data transmit device and data receive devices;
   a control means at said transmitter device and receiver device for controlling respective data signal transmit and receive operations over said first and second communications channels, said control means at said transmitter capable of detecting idle data transmit states over said first communication channel;
   a data integrity verifier means at said transmitter device and receiver device for verifying integrity of said first data and second data content communicated as signals over respective said first and second channels in between instances of detected idle data transmit states,
   wherein data integrity information for transmitted first data and second data accumulated at said transmitter since a last detected idle data transmit state is communicated over one of said channels for receipt by said receiver device for data integrity verification in response to detection of a current idle data transmit state, thereby optimizing bandwidth utilization of said channel.

24. The system for verifying data integrity as claimed in claim 23, further including means for notifying said receiver device of a detected idle data transmit state, said control means at said receiver device responsive to said notification for initiating data integrity verification for first and second data received from said transmitter since said prior detected idle data transmit state.

25. The system for verifying data integrity as claimed in claim 24, wherein said notifying means generates an IDLE state signal for notifying said receiver device of a detected idle data transmit state, said generated IDLE state signal being communicated to said receiver device over one of: said first or second communications channels or, a separate communication signal line.

26. A method for verifying integrity of data signals communicated between a data transmit device and a data receive device in a communications network, said network including a first communication channel for communicating signals of first data content between said data transmit device and a data receive device, and a second communi cation channel for communicating second data content between said data transmit device and data receive devices, and including a means controlling respective data signal transmit and receive operations over said first and second communications channels, said method comprising the steps of:

a) detecting idle data transmit states over said first communication channel at said transmit device;

a) accumulating data integrity information for said first and second data content transmitted over respective said first and second communication channels between detected idle transmit instances, said accumulating being performed by data integrity verifier devices at both transmit and receive devices;

c) communicating over said first communication channel said data integrity information for said first and second data content transmitted over respective said first and second communication channels since a last detected idle data transmit instance; and, d) verifying accumulated data integrity information communicated over said channel at said receiver device.

* * * * *